(12) United States Patent
Nakamura et al.

(10) Patent No.: US 6,498,885 B1
(45) Date of Patent: Dec. 24, 2002

(54) SEMICONDUCTOR NONLINEAR WAVEGUIDE AND OPTICAL SWITCH

(75) Inventors: Shigeru Nakamura, Tokyo (JP); Kazuhito Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/369,242

(22) Filed: Aug. 5, 1999

(30) Foreign Application Priority Data

Aug. 5, 1998 (JP) .............................. 10-221192

(51) Int. Cl.[7] .............. G02B 6/00; G02B 6/02
(52) U.S. Cl. ...................... 385/122; 385/126
(58) Field of Search ................. 385/1–3, 122, 385/126, 128, 14, 16

(56) References Cited

U.S. PATENT DOCUMENTS 5,557,700 A * 9/1996 Nakakura et al. ............ 385/122
6,323,992 B1 * 11/2001 Ueno ........................ 359/332

FOREIGN PATENT DOCUMENTS

| JP | 4-3125 | 1/1992 |
| JP | 5297421 | 11/1993 |
| JP | 886718 | 4/1996 |
| JP | 2531443 | 6/1996 |
| JP | 8-179385 | 7/1996 |
| JP | 81252 | 8/1996 |

* cited by examiner

Primary Examiner—Frank G. Font
Assistant Examiner—Juan D. Valentin
(74) Attorney, Agent, or Firm—Young & Thompson

(57) ABSTRACT

Concerning an all-optical switch which makes use of a nonlinear change of a refractive index of a nonlinear waveguide caused by absorption of a control light, a method that an electrostatic field is applied to the nonlinear waveguide is known as an effective one for shortening a lifetime of the carrier which obstructs an improvement of a repetition frequency of a switching operation. The semiconductor nonlinear waveguide is constituted of a pin-structure which comprises a nondoped InGaAsP optical waveguide, an under cladding layer formed of a N-type InP substrate and an upper cladding layer formed of a p-type InP layer and etc. Moreover, the under and upper cladding layers are electrically shortcircuited via upper and lower electrodes. Since a builtin voltage caused by a difference in Fermi level between n and p-type cladding layers is applied to a InGaAsP optical waveguide, and electrostatic field can be applied to the optical waveguide of the pin structure to some extent without using a constant-voltage power supply. By application of the aforementioned electrostatic field, the effective lifetime of the carrier is shortened, and a repetition frequency of an switching operation of the all-optical switch can be improved.

6 Claims, 7 Drawing Sheets

SEMICONDUCTOR NONLINEAR WAVEGUIDE AND OPTICAL SWITCH

FIELD OF THE INVENTION

The invention relates to a semiconductor nonlinear waveguide and an optical switch comprising a semiconductor nonlinear waveguide, and especially to a semiconductor nonlinear waveguide and an optical switch used in a field of an optical fiber communication and an optical information process.

BACKGROUND OF THE INVENTION

In an all-optical switch comprising a semiconductor nonlinear waveguide, if a period of repetition of the control light pulses is shorter than the lifetime of the carriers generated in a core of the semiconductor nonlinear waveguide, the all-optical switch operates in a condition that the carriers accumulate in the core of the semiconductor nonlinear waveguide. The accumulation of the carriers degrades the nonlinear property of the semiconductor nonlinear waveguide, and obstructs the realization of the all-optical switch with excellent performances. Accordingly, it can be admitted that a method proposed in Japanese Patent Kokai 4-3125, in which an electrostatic field is applied to the semiconductor nonlinear waveguide to shorten the lifetime of the carrier, is an effective one for deducing the accumulation of the carriers, but the structure of the all-optical switch becomes complicated.

SUMMARY OF THE INVENTION

Accordingly, it is an object of the invention to provide a semiconductor nonlinear waveguide, in which an electrostatic field can be applied to a core layer of the semiconductor nonlinear waveguide without using an external constant-voltage power supply.

It is a further object of the invention to provide a semiconductor nonlinear waveguide, in which an electrostatic field can be applied to an InGaAsP core layer of the semiconductor nonlinear waveguide without using an external constant-voltage power supply.

It is a still further object of the invention to provide an optical switch according to a Mach-Zehnder interferometer having a pair of semiconductor nonlinear waveguides, in each of which an electrostatic field can be applied to a core layer of the semiconductor nonlinear waveguide without using an external constant-voltage power supply.

It is a yet further object of the invention to provide an optical switch according to a Mach-Zehnder interferometer having a pair of semiconductor nonlinear waveguides, in each of which an electrostatic field can be applied to an InGaAsP core layer of the semiconductor nonlinear waveguide without using an external constant-voltage power supply.

It is a yet still further object of the invention to provide an optical switch having a single semiconductor nonlinear waveguide, in which an electrostatic field can be applied to a core layer of the semiconductor nonlinear waveguide without using an external constant-voltage power supply.

It is an additional object of the invention to provide an optical switch having a signal semiconductor nonlinear waveguide, in which an electrostatic field can be applied to an InGaAsP core layer of the semiconductor nonlinear waveguide without using an external constant-voltage power supply.

According to the first feature of the invention, a semiconductor nonlinear waveguide comprises:

a nondoped core layer formed of a medium showing a nonlinear refractive index caused by absorption of a control light, an under cladding layer of a first conductivity type formed under the nondoped core layer, an upper cladding layer of a second conductivity type formed on the nondoped core layer, and means for electrically shortcircuiting the under and upper cladding layers.

According to the second feature of the invention, a semiconductor nonlinear waveguide comprises:

a n-type InP substrate, a nondoped InGaAsP optical waveguide of a strip structure formed on the n-type InP substrate, nondoped InP layers formed on both sides of the nondoped InGaAsP optical waveguide, a p-type InP layer formed on the nondoped InGaAsP optical waveguide and the nondoped InP layers, a p-type InGaAs cap layer formed on the p-type InP layer, electrodes respectively formed on an obverse surface of the InGaAs cap layer and a reverse surface of the n-type InP substrate, and means for electrically shortcircuiting the electrodes formed on the obverse and reverse surfaces.

According to the third feature of the invention, an optical switch comprises:

a Mach-Zehnder interferometer provided with a pair of semiconductor nonlinear waveguides on both arms thereof, wherein a refractive index of each of the semiconductor nonlinear waveguides changes by absorption of a control light, and means for supplying the semiconductor nonlinear waveguides with the control light pulses in turn at a predetermined difference in time, which is shorter than a relaxation time of the change of the refractive index of each of the semiconductor nonlinear waveguides, wherein each of the semiconductor nonlinear waveguides comprises:

a nondoped core layer formed of a medium showing a nonlinear refractive index, an under cladding layer of a first conductivity type formed under the nondoped core layer, an upper cladding layer of a second conductivity type formed on the nondoped core layer, and means for electrically shortcircuiting the under and upper cladding layers.

According to the fourth feature of the invention, an optical switch comprises:

a Mach-Zehnder interferometer provided with a pair of semiconductor nonlinear waveguides on both arms thereof, wherein a refractive index of each of the semiconductor nonlinear waveguides changes by absorption of a control light, and means for supplying the semiconductor nonlinear waveguides with the control light pulses in turn at a predetermined difference in time, which is shorter than a relaxation time of the change of the refractive index of each of the semiconductor nonlinear waveguides, wherein each of the semiconductor nonlinear waveguides comprises:

a n-type InP substrate, a nondoped InGaAsP optical waveguide of a strip structure formed on the n-type InP substrate, nondoped InP layers formed on both sides of the nondoped InGaAsP optical waveguide, a p-type InP layer formed on the nondoped InGaAsP optical waveguide and the nondoped InP layers, a p-type InGaAs cap layer formed on the p-type InP layer, electrodes respectively formed on an obverse surface of the InGaAs cap layer and a reverse surface of the n-type InP substrate, and means for electrically shortcircuiting the electrodes formed on the obverse and reverse surfaces.

According to the fifth feature of the invention, an optical switch comprises:

a semiconductor nonlinear waveguide, which shows a change in a refractive index by absorption of a control light, means for separating a signal light into two linearly polarized signal lights perpendicular to each other, means for generating a difference in a propagation time between the two linearly polarized signal lights perpendicular to each other, means for propagating the two linearly polarized signal lights perpendicular to each other through the semiconductor nonlinear waveguide, means for supplying a control light to the semiconductor nonlinear waveguide at a predetermined time, and means for canceling the difference in the propagation time between the two linearly polarized signal lights perpendicular to each other, wherein the nonlinear waveguide comprises:

a nondoped core layer formed of a medium showing a nonlinear refractive index, an under cladding layer of a first conductivity type formed under the nondoped core layer, an upper cladding layer of a second conductivity type formed on the nondoped core layer, and means for electrically short circuiting the under and upper cladding layers.

According to the sixth feature of the invention, an optical switch comprises:

a semiconductor nonlinear waveguide, which shows a change in a refractive index by absorption of a control light, means for separating a signal light into two linearly polarized signal lights perpendicular to each other, means for generating a difference in a propagation time between the two linearly polarized signal lights perpendicular to each other, means for propagating the two linearly polarized signal lights perpendicular to each other through the semiconductor nonlinear waveguide, means for supplying a control light to the semiconductor nonlinear waveguide at a predetermined time, and means for canceling the difference in the propagation time between the two linearly polarized signal lights perpendicular to each other, wherein the nonlinear waveguide comprises:

a n-type InP substrate, a nondoped InGaAsP optical waveguide of a strip structure formed on the n-type InP substrate, nondoped InP layers formed on both sides of the nondoped InGaAsP optical waveguide, a p-type InP layer formed on the nondoped InGaAsP optical waveguide and the nondoped InP layers, a p-type InGaAs cap layer formed on the p-type InP layer, electrodes respectively formed on an obverse surface of the InGaAs cap layer and a reverse surface of the n-type InP substrate, and means for electrically shortcircuiting the electrodes formed on the obverse and reverse surfaces.

BRIEF DESCRIPTION OF THE DRAWING

The invention will be explained in more detail in conjunction with appended drawings, wherein.

DESCRIPTION OF THE PREFERRED EMBODIMENTS

Figure 1:
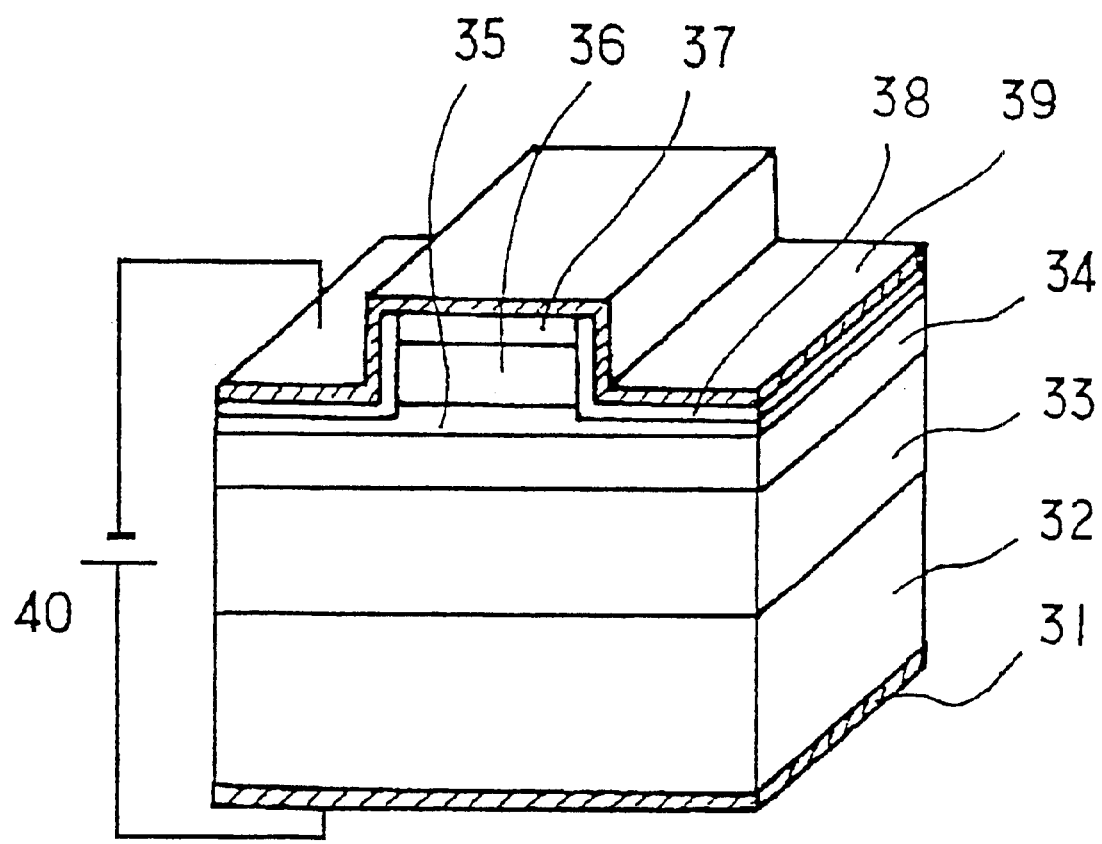
FIG. 1 is a perspective view for showing a semiconductor nonlinear waveguide according to the conventional technology.

Before explaining a semiconductor nonlinear waveguide and optical switches using the same in the preferred embodiments according to the invention, the aforementioned conventional nonlinear waveguides and optical switches using the same will be explained referring to appended drawings.

Recently, all-optical systems of the optical fiber communication, an optical exchange and an optical information process are widely advocated, and research and development for realization of these subjects are actively conducted. The all-optical system means that the signal propagated through a transmission line, a multiplexing/demultiplexing circuit, or a logical circuit is transmitted as an optical signal without being optical to electrical or electrical to optical converted on the course of the transmission or the processing. In the aforementioned all-optical system, a circuit element for controlling the optical signal at a high speed becomes necessary. Although a method for controlling the optical signal by means of the electrical signal (electrical to optical control) has been adopted as a method for controlling the optical signal until now, recently a method for controlling the optical signal by means of the control light attracts attentions of engineers in this field as a method for achieving a higher speed. Especially, if an optical switch controlled by a light (an all-optical switch, hereinafter) with an ultrahigh speed is applied to an optical demultiplexer used in the optical communication system, it will be an epochal break through for realization of the ultrahigh speed optical communication. Although a high switching speed is the first attractive feature of the all-optical switch and a property to be realized, besides this, the all-optical switch is required to consume a low switching energy, have a switching characteristic of a high repetition frequency and be compact sized.

An important problem in realizing the aforementioned performances is an empirical knowledge that a figure of merit of a nonlinear optical effect is nearly constant. The nonlinear optical effect is regarded as a fundamental principle in driving the all-optical switch, and the figure of merit of the same is given as $\chi^3/\tau\alpha$, where $\chi^3$ is a measure of a nonlinearly, $\tau$ is a response time, and a is $\alpha$ loss of an optical signal. The nonlinear optical effect is classified into a resonance excitation type and a nonresonance excitation type. However, it is regarded as difficult to simultaneously provide high efficiency and high speed in both the types of excitation. In the case of the nonresonance excitation type, a high switching speed can be expected, but an efficiency is low. Accordingly, high switching energy or a long interaction length is required. On the other hand, in the case of resonance excitation type, the all-optical switch of high efficiency can be provided, but a relaxation time of electrons really excited in a nonlinear optical medium is long, which obstructs a realization of the all-optical switch with a high switching speed. However, in recent years, it is again recognized that the high efficiency of the all-optical switch of the resonance excitation type is the highly attractive characteristic from a view point of practical use, and several methods for overcoming a difficulty caused by a slow relaxation of the excited electrons have been proposed. For example, an all-optical switch disclosed in Japanese Patent Kokai No. 4-3125 makes use of the nonlinear optical effect of the resonance excitation type and applies an electrostatic field to a semiconductor nonlinear waveguide, in which a nonlinear refractive index is induced. In this optical switch, a phase modulation is applied to an optical signal transmitted through the nonlinear waveguide by absorption of a control light in the nonlinear waveguide. That is to say, if the carriers are excited by absorption of the control light, an optical signal having a wavelength longer than a band gap wavelength undergoes a nonlinear phase shift caused by a band filling effect. Although a time necessary for induction of the nonlinear shift is very short (less than 1 ps), the relaxation time thereof is determined by a lifetime of the carrier and usually 100 ps to 1 ns, a large number. For this reason, the aforementioned optical switch adopts a method for sweeping the excited carriers out of the optical waveguide with a high speed by applying an electrostatic field to the nonlinear waveguide. Accordingly, the lifetime of the carrier in the nonlinear waveguide is effectively shortened, and a high speed phase modulation of the optical signal can be realized.

FIG. 1 shows an example of a semiconductor nonlinear waveguide used for the aforementioned optical switch. A 0.2 $\mu$m thick $10^{18}$ cm$^{-3}$ Si-doped Al$_x$Ga$_{1-x}$As (x=0.07) under cladding layer 33, a 0.59 $\mu$m thick nondoped GaAs core layer 34, a 0.2 $\mu$m thick nondoped Al$_x$Ga$_{1-x}$As (x=0.07) upper cladding layer 35, a 0.6 $\mu$m thick $10^{18}$ cm$^{-3}$ Be-doped Al$_x$Ga$_{1-x}$As (x=0.07) upper cladding layer 36, and 0.2 $\mu$m thick $10^{18}$ cm$^{-3}$ Be-doped GaAs cap layer 37 are successively formed on a $10^8$ cm$^{-3}$ Si-doped GaAs substrate 32. Moreover, a stripe having a high of 0.9 $\mu$m and a width of 4 $\mu$m is formed by an etching process. A SiO$_2$ insulative film 38 and an electrode 39 are formed on a surface of the semiconductor waveguide, and the electrode 39 ohmically contacts with the GaAs cap layer 37. An ohmic electrode 31 is formed on a reverse surface of the substrate 32 also. reverse bias voltage is applied between the aforementioned electrodes 31 and 39 by connecting a constant-voltage power supply 40 between them. If control light pulses to be absorbed by the optical waveguide and signal light pulses to be transmitted through the optical waveguide are supplied to the nonlinear waveguide, carriers are generated in the optical waveguide by absorption of the control light, and a nonlinear phase shift of the signal light is induced. The carriers thus generated are swept away from the optical waveguide by an electrostatic field applied to the optical waveguide, and thereby the nonlinear phase shift is relaxed and vanished.

Figure 2:
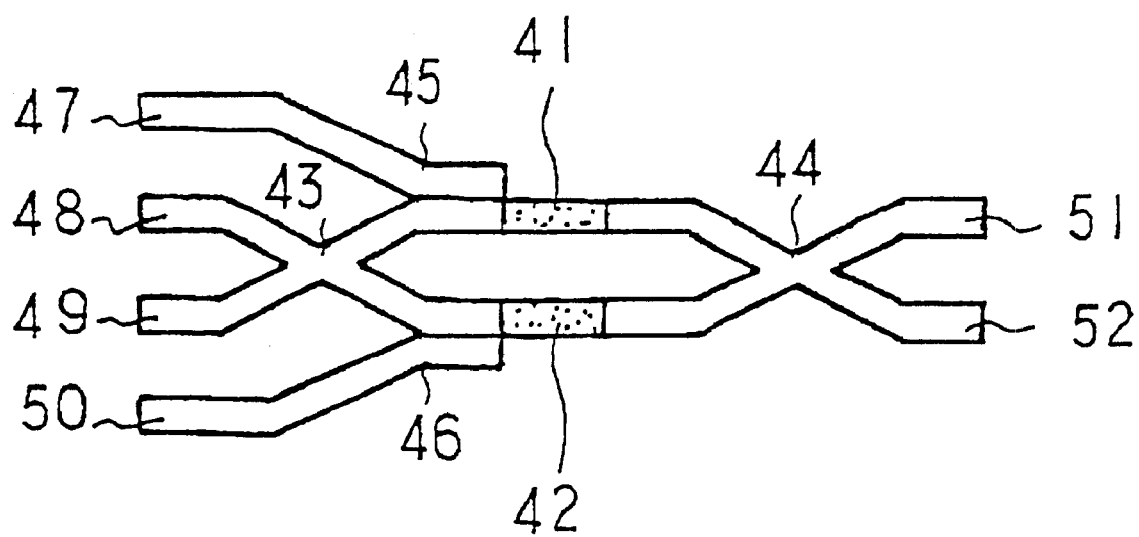
FIG. 2 shows an example of a structure of an optical switch according to the conventional technology.

In Japanese Patent Kokai No. 7-20510, an all-optical switch based on a nonlinear effect of a resonance type is disclosed. In a nonlinear waveguide which has absorbed a control light, a signal light propagating therethrough undergoes a nonlinear phase shift. The structure of this optical switch is shown in FIG. 2. The signal light is inputted to the input port 48, once divided by a 3 dB coupler 43, and again combined by a 3 dB coupler 44. Whether the signal light is outputted from the output port 51 or the same 52 depends on a difference in a phase between two lights inputted to input ports of the 3 dB coupler 44. The optical switch shown in FIG. 2 is constructed so that the signal light is outputted from an output port 51 light in the initial state. Input ports 47 and 45 are supplied with the control light pulses in turn at a certain difference in time T. These control light pulses respectively pass through wavelength selective couplers 45 and 46, and are inputted to nonlinear waveguides 41 and 42. First, if the control light plus inputted from the input port 47 is absorbed by the nonlinear waveguide 41, the signal light passing through the nonlinear waveguide 41 undergoes the nonlinear phase shift, and the signal light is switched to the output port 52 from the output port 51. Since the change of a refractive index in the nonlinear waveguide 41 is caused by excitation of carriers due to absorption of the control light pulse, the refractive index is raised with an ultrahigh speed following the control light pulse, but a relaxation time of carrier is long and it takes a long time to recover the initial state. However, if the control light pulse is inputted to the input port 50 after a time of T and absorbed by a nonlinear waveguide 42, the signal light passing through the nonlinear waveguide 42 undergoes a nonlinear phase shift. Thereby, the effect of the change in the refractive index remaining in the nonlinear waveguide 41 is canceled. Accordingly, the signal light returns to the output 51. In this way, a high speed switching of the signal light becomes possible.

In the all-optical switch disclosed in Japanese Patent Kokai No. 7-20510, if a period of repetition of the control light pulses is shorter than lifetime of the carrier, the all-optical switch operates in a condition that the carriers accumulate in the optical waveguide. If the accumulation of the carriers becomes high, the change of the nonlinear refractive index saturates and an extinction ratio degrades. That is to say, it is desirable that the accumulation of the carriers is low. If the energy of the control light pulse is constant, the accumulation of the carriers is determined by the ratio of the period of repetition of the control light pulses to the lifetime of the carrier, and the accumulation of the carriers becomes low as the lifetime of the carrier is short. Accordingly, it can be admitted that a method disclosed in Japanese Patent Kokai No. 4-3125, in which an electrostatic field is applied to the nonlinear waveguide in order to shorten the lifetime of the carrier, is an effective one for reducing the accumulation of the carriers. However, an external constant-voltage power supply for applying a reverse bias becomes necessary in the aforementioned the all-optical switch, and the structure thereof becomes complicated.

Figure 3:
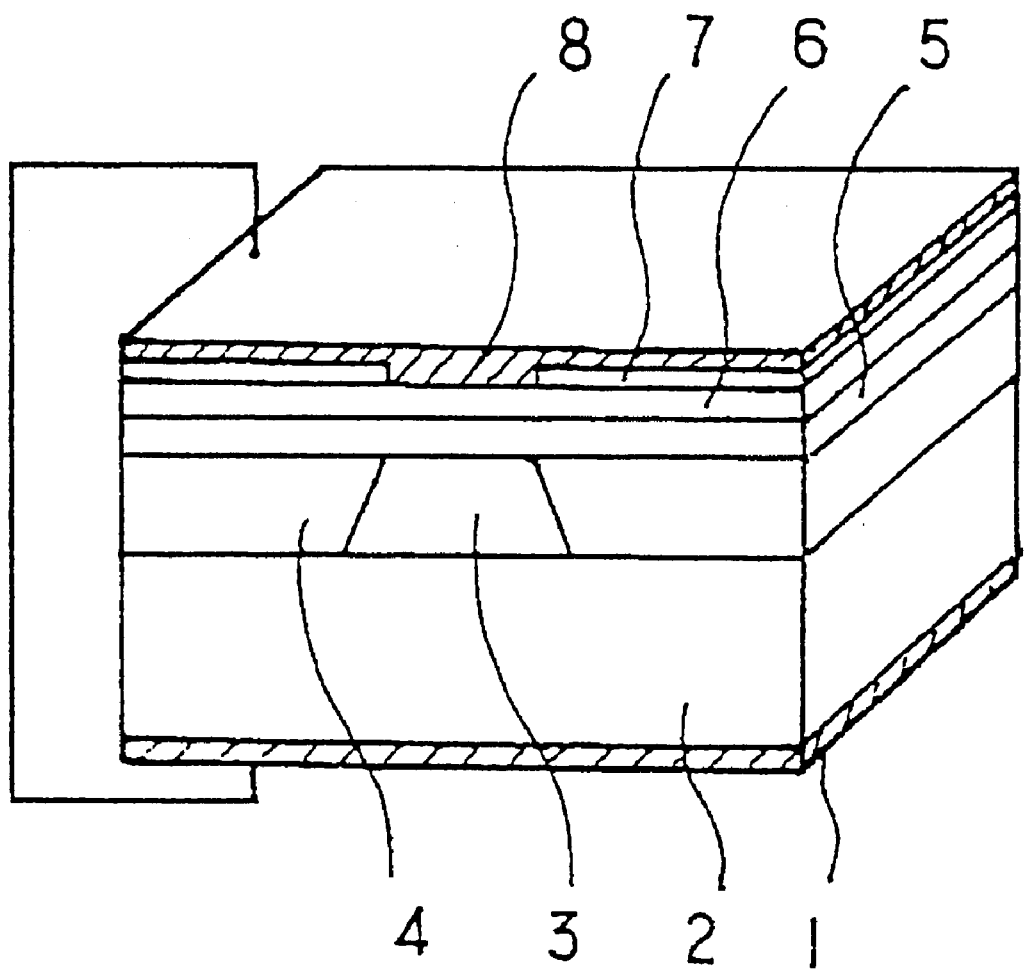
FIG. 3 is a perspective view for showing a semiconductor nonlinear waveguide according to a preferred embodiment of the invention.

Next, embodiments of the invention will be explained referring to appended drawings. FIG. 3 shows a structure of a semiconductor nonlinear waveguide. First, a nondoped InGaAsP optical waveguide 3 is formed on a n-type InP substrate 2 serving as an under cladding layer. A band gap wavelength of InGaAsP is 1.45 μm. Moreover, nondoped InP layers 4 serving as a part of upper cladding layers are formed on both the sides of the InGaAsP optical waveguide 3, and a p-type InP buried layer 5 serving as another part of the upper cladding layer is grown thereon. A p-type InGaAs cap layer 6 is formed on the whole surface of the p-type InP buried layer 5. On a surface of a semiconductor waveguide thus obtained, a $SiO_2$ insulative layer 7 and an electrode 8 are successively formed, and the electrode 8 ohmically contacts with the InGaAs cap layer 6. An ohmic electrode 1 is formed on a reverse surface of the n-type InP substrate 2.

In the semiconductor nonlinear waveguide, the electrodes 1 and 8 are externally connected with each other, and thereby a builtin voltage caused by a difference in Fermi level between the n and p-type cladding layers is applied to the nondoped InGaAsP optical waveguide 3. If a control light pulse with a wavelength of 1.3 μm to be absorbed by the optical waveguide 3 and a signal light pulse with the wavelength of 1.55 μm to be transmitted through the optical waveguide 3 are supplied to the nonlinear waveguide, carriers are generated in the optical waveguide 3 and a nonlinear phase shift of the signal light is induced. The carriers are swept away to the outside of the optical waveguide 3 by an electrostatic field caused by aforementioned builtin voltage, hence the nonlinear phase shift is relaxed and vanished.

In the aforementioned optical waveguide 3, the lifetime of the carrier is 150 ps on condition that a pin construction is open circuited, and 65 ps on condition that the pin construction is shortcircuited. Accordingly, in case that a control pulse series with a period of 100 ps is applied to the nonlinear waveguide, the accumulation of the carriers therein is changed dependently on the condition of an edge termination of the pin construction.

Figure 4:
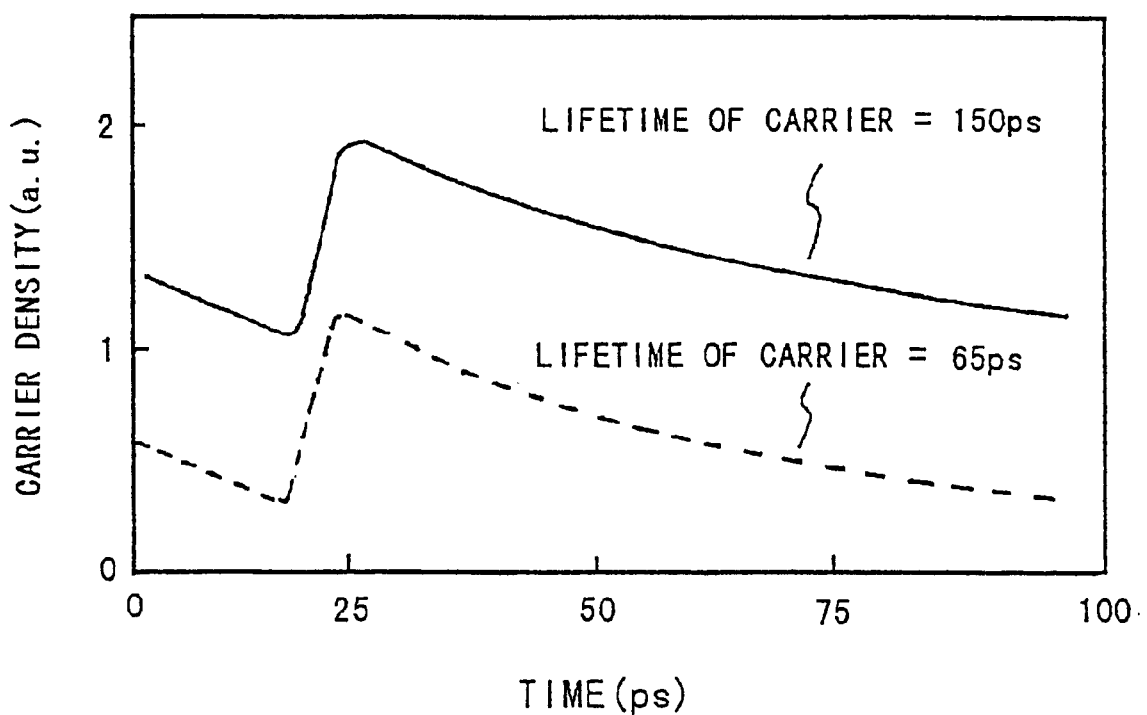
FIG. 4 shows a carrier density in a semiconductor nonlinear waveguide as a function of time.

FIG. 4 shows the results of calculation on carrier densities in media as functions of time for cases that a control light pulse series of a pulse width of 2 ps and a period of 100 ps is absorbed by the media with the lifetimes of the carriers of 150 ps and 65 ps. In either case, the carrier density is given as a superposition of an accumulation of the carriers of a certain amount and a periodic variation of the carrier density caused by an absorption of the control light pulses. The accumulation of the carriers in the medium with the lifetime of the carriers of 65 ps is less than that in the medium with the same of 150 ps. Moreover, the difference in the carrier accumulation between both the cases results in the difference in the nonlinear phase shift of the signal light. Actually, the nonlinear phase shift of the signal light caused by absorption of the control light pulses in a case where the edge of the pin construction is shortcircuited is 1.6 times larger than that in a case where the same is open circuited.

Figure 5:
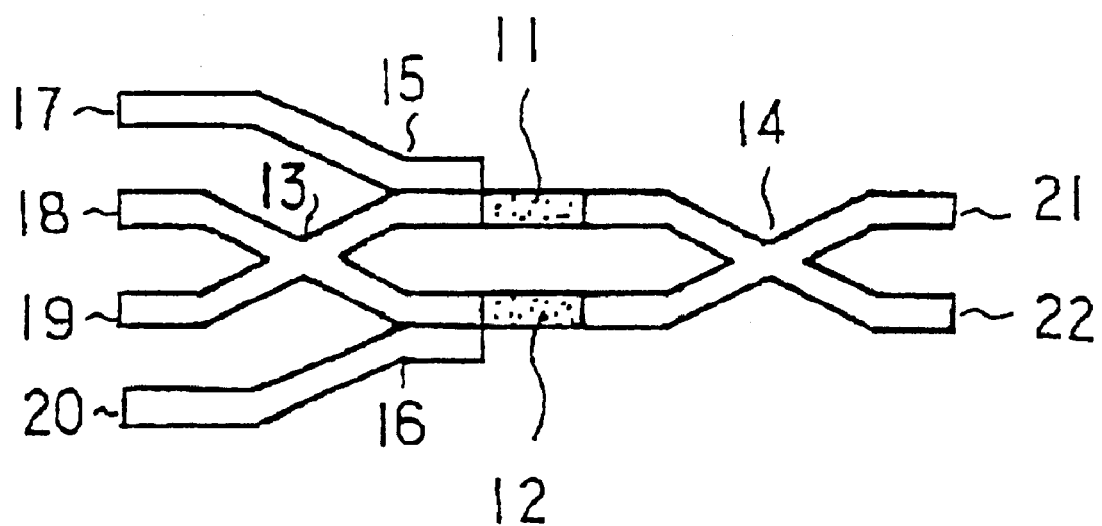
FIG. 5 shows a structure of an optical switch using a semiconductor on linear waveguide according to the invention as the first preferred embodiment.

FIG. 5 shows an optical switch according to the first preferred embodiment of the invention comprising semiconductor nonlinear waveguides shown in FIG. 3. As shown in FIG. 3, each of nonlinear waveguides 11 and 12 is composed of a nondoped InGaAsP optical waveguide 3 and n and p-type InP layers 2, 4 and 5 which put the optical waveguide 3 therebetween, and the under and upper cladding layers are externally shortcircuited. Since control lights are absorbed by the nonlinear waveguide 11 and 12, signal lights transmitting therethrough undergo nonlinear phase shifts. The signal light is supplied to an input port 18, once divided by a 3 dB coupler 13, and again combined by a 3 dB coupler 14. Whether the combined light is outputted from a port 21 or 22 depends on a difference in a phase between two divided light supplied to input ports of the 3 dB coupler 14. The optical switch shown in FIG. 5 is constructed so that the signal light is outputted from the output port 21 in the initial state. Input ports 17 and 20 are supplied with control light pluses in turn at a certain difference in time T. These control light pulses respectively pass through wavelength selective couplers 15 and 16, and are inputted to the nonlinear waveguides 11 and 12. First, if the control light pulse inputted from the input port 17 is absorbed by the nonlinear waveguide 11, the signal light passing through the nonlinear waveguide 11 undergoes a nonlinear phase shift and the signal light is switched to the output port 22 from the same 21.

Since the change in a refractive index of the aforementioned nonlinear waveguide 11 is caused by an excitation of the carriers due to absorption of the control light, although the refractive index is raised with an ultrahigh speed, the relaxation time thereof is long, and it takes a long time to recover the initial state. However, after a time T is passed, when the control light pulse supplied from the input port 20 is absorbed by the nonlinear waveguide 12, the signal light passing through the nonlinear waveguide 12 undergoes a nonlinear phase shift. Thereby, the effect of the change in the refractive index remaining in the nonlinear waveguide 11 is canceled. Accordingly, the signal light returns to the output port 21 and is outputted therefrom. In this way, a high speed switching operation of the signal light become possible. By the way, when the input ports 17 and 20 are supplied with series of the control light pulses of a pulse width of 2 ps and a repetition frequency of 10 GHZ at a difference in time of 6 ps, the aforementioned optical switch for the signal light shows an excellent performance that a switching time is 6 ps and the repetition frequency is 10 GHz.

Figure 6:
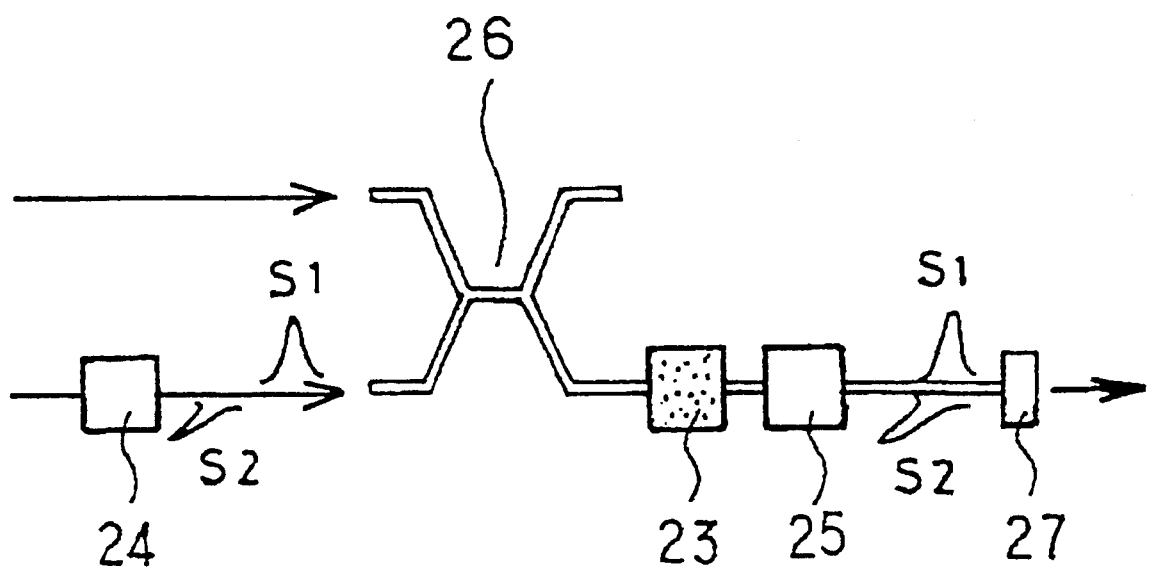
FIG. 6 shows a structure of the optical switch using a semiconductor nonlinear waveguide according to the invention as the second preferred embodiment.

FIG. 6 shows a structure of an optical switch according to the second preferred embodiment of the invention. The fundamental principle of this optical switch is nearly the same as that of an optical switch disclosed in Japanese Patent Kokai No. 8-179385. A signal light transmitting through a nonlinear waveguide 23 undergoes a nonlinear phase shift, because a control light is absorbed thereby. Birefringent crystals 24 and 25 are formed of a rutile signal crystal ($TiO_2$). The rutile single crystal shows a birefringent property that there is a difference in a propagation time between a light pulse linearly polarized perpendicularly to the optical axis (an ordinary ray) and the same linearly polarized in parallel with the optical axis (an extraordinary ray). An analyzer 27 transmits only a light linearly polarized in a specific direction. In this optical switch, a semiconductor nonlinear waveguide shown in FIG. 3 is used as the nonlinear waveguide 23. That is to say, the nonlinear waveguide 23 is composed of a nondoped InGaAsP optical waveguide and en and p-type InP cladding layers, and both the InP cladding layers are electrically shortcircuited in the outside.

The optical switch is supplied with a signal light pulse series of a wavelength of 1.55 μm, a pulse width of 2 ps and a repetition frequency of 160 GHz, and a control light pulse series of a wavelength of 1.30 μm, a pulse width of 2 ps and a repetition frequency of 10 GHZ. That is to say, the wavelength of the signal light is set in a transparent region, and that of the control light is set in an absorption region. The control light is supplied to the nonlinear waveguide 23 via a wavelength selective coupler 26, and absorbed thereby. In the nonlinear waveguide 23, the carriers are excited by the absorption of the control light, and the signal light undergoes a nonlinear phase shift. On the other hand, in the signal light pulse supplied to a birefringent crystal 24, there arises a difference in a delay time between a S-1 component (the ordinary pay) polarized perpendicularly to the optical axis of the birefringent crystal 24 and a S-2 component (the extraordinary ray) polarized in parallel with the optical axis. In case that rutile is used as the birefringent crystal 24, the S-2 component lags behind the S-1 component. These signal light pulses pass through the wavelength selective coupler 26, and is supplied to the nonlinear waveguide 23. The S-1 and S-2 components respectively propagate therethrough as the TM and TE polarization lights. The signal lights emitted from the nonlinear waveguide 23 are respectively supplied to the birefringent crystal 25 so that the polarization of the S-1 component is parallel with the optical axis and the same of the S-2 component is perpendicular to the optical axis. Thereby, the difference in the delay time between the S-1 and S-2 components caused by the birefringent crystal 24 is cancelled, and both the polarization components are again combined. The polarization of the signal light, which is combined on condition that a difference in a phase between both the polarization components incident upon the birefringent crystal 25 is zero, is perpendicular to the same combined on condition that the difference in the phase is $\pi$. The signal light emitted from the birefringent crystal 25 is inputted to the analyzer 27, and only the signal light linearly polarized in the specific direction can pass therethrough. According to the aforementioned property, an optical switch for outputting only a selected light can be provided.

Figure 7A:
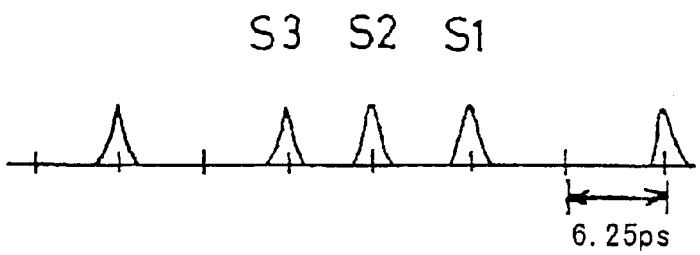
FIG. 7A to FIG. 7G show waveforms of light pulses for explaining an operation of an optical switch shown in FIG.6.
Figure 7B:
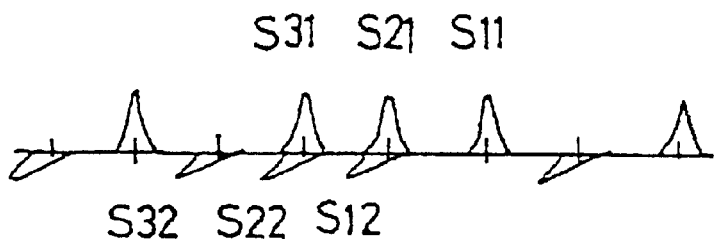
Figure 7C:
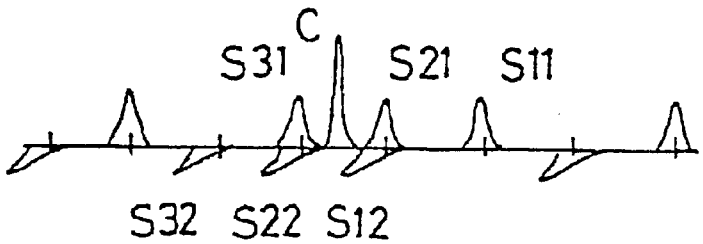
Figure 7D:
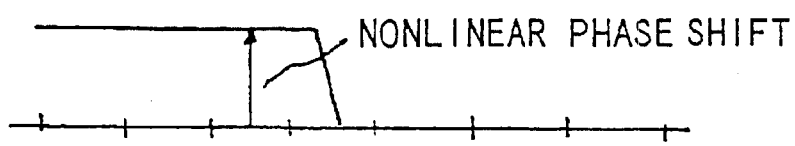
Figure 7E:
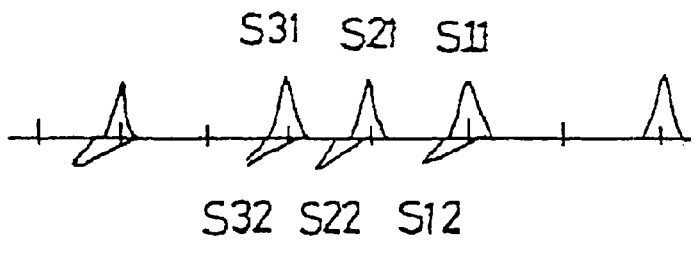
Figure 7F:
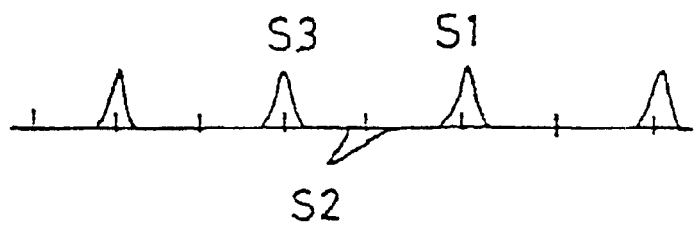
Figure 7G:
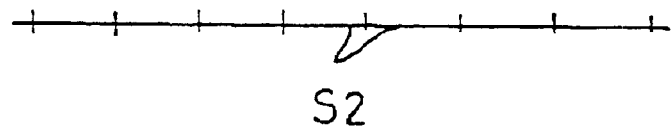

FIGS. 7A to 7G explain the operation of the aforementioned optical switch, and a following case will be discussed according to these drawings. In the initial state, a difference in a relative phase between the S-1 and S-2 components, both being emitted from the birefringent crystal 25, is zero, and a linearly polarized light given as the superposition of both the components is perfectly blocked by the analyzer 27. As shown in FIG. 7A, the signal light pulses are successively inputted to the optical switch at an interval of 6.25 ps. In this case, a series of the signal light pulses coded by "10111010" is exemplified. Among them, three pulses S1, S2, S3 will be remarked. Since these light pulses pass through the birefringent crystal 24, a difference in a delay time arises between two components perpendicular to each other, S11, S21 to S31 and S12, S22 to S23, as shown in FIG. 7B. After a control light pulse C is inserted into the signal light pulses at a position shown in FIG. 7C, the control light pulse C passes through the nonlinear waveguide 23. The nonlinear refractive index thereof is raised approximately following insertion of the control light pulse C, and relaxed slowly thereafter. Since the relaxation time of the nonlinear reflective index is long as compared with the time scale shown FIG. 6, the nonlinear phase shift is represented as a step function for simplicity as shown in FIG. 7D. The signal light pulses S31, S22, S32 and etc, which are inputted to the nonlinear waveguide 23 lagging behind the control light pulse C undergo a nonlinear phase shift of $\pi$. Since the signal light pulses emitted from the nonlinear waveguide 23 further pass through the birefringent crystal 25, the difference in the delay time between the S-1 and S-2 components caused by the birefringent crystal 24 are cancelled as shown in FIG. 7E. As the result, as shown in FIG. 7F, only a difference in the relative phase between S21 and s22 becomes $\pi$, and the polarization of the combined signal light rotates by 90° relative to that in the initial state. On the other hand, since both of S11 and S12 do not undergo the nonlinear phase shift, the relative phase difference therebetween is zero. Similarly, since both of S31 and S32 undergo the nonlinear phase shift, the relative phase difference theirbetween is zero also. That is to say, the direction of the polarization of S3 given as a superposition of S31 and S32 is the same as that in the initial state. Accordingly, when the signal light pulses are inputted to the analyzer 27, only S2 passes therethrough as shown in FIG. 7G. According to the aforementioned mechanism, and ultrahigh speed. all-optical switch which periodically separates desired signal light pulses from the signal light pulse series of 160 Gb/s at the repetition frequency of 10 GHz can be realized. In this connection, an optical switch for the signal light pulses with an excellent extinction ratio can be realized by the use of the control lights pulse series of a pulse width of 2 ps and a repetition frequency of 10 GHz.

In the aforementioned embodiment of the invention, although explanations are given to a nonlinear waveguide which is composed of a InGaAsP core and InP cladding layers and optical switches comprising the aforementioned nonlinear waveguide as examples, similar effect can be achieved in case that a nonlinear waveguide formed of other material is used. That is to say, a nonlinear waveguide comprising a core formed of an InGaAs/InGaAsP multiple quantum well structure which can be formed on an InP substrate or other material which can be formed on a GaAs substrate can be exemplified.

As mentioned in the above, since the semiconductor nonlinear waveguide according to the invention is a pin type semiconductor waveguide, which is composed of a nondoped core layer formed of a medium showing nonlinear refractive index by absorption of the control light, an under cladding layer of the first conductivity type formed under the core layer and an upper cladding layer of the second conductivity type formed on the core layer, and the under and upper cladding layers are electrically short circuited in the outside of the pin waveguide, a builtin voltage caused by a difference in Fermi level between the under and upper cladding layers can be applied to the core layer, even in case that an external power supply is not used, and an electrostatic field can be applied to the core layer to some extent. Accordingly, in the semiconductor nonlinear waveguide according to the invention, a complexity of a structure due to the external power supply can be avoided. Furthermore, the accumulation of the carriers caused by the control light at the time of the repeated operations of a high frequency can be reduced. Then, by applying the semiconductor nonlinear waveguide according to the invention to the optical switch, a switching operation having an excellent repetition characteristic can be obtained.

What is claimed is:

1. A semiconductor nonlinear waveguide, comprising:
    a nondoped core layer formed of a medium showing a nonlinear refractive index caused by absorption of a control light,
    an under clad layer of a first conductivity type formed under said nondoped core layer,
    an upper clad layer of a second conductivity type formed on said nondoped core layer, and
    means for electrically shortcircuiting said under and upper clad layers.

2. A semiconductor nonlinear waveguide, composing:
    a n-type InP substrate,
    a nondoped InGaAsP optical waveguide of a strip structure formed on said n-type InP substrate,
    nondoped InP layers formed on both sides of said nondoped InGaAsP optical waveguide,
    a p-type InP layer formed on said nondoped InGaAsP optical waveguide and said nondoped InP layers, a p-type InGaAs cap layer formed on said p-type InP layer, electrodes respectively formed on an obverse surface of said InGaAs cap layer and a reverse surface of said n-type InP substrate, and means for electrically shortcircuiting said electrodes formed on said obverse and reverse surfaces.

3. An optical switch comprising:

a Mach-Zehnder interferometer provided with a pair of semiconductor nonlinear waveguides on both arms thereof, wherein a refractive index of each of said semiconductor nonlinear waveguides changes by absorption of a control light, and means for supplying said semiconductor nonlinear waveguides with said control light pulses in turn at a predetermined difference in time, which is shorter than a relaxation time of said change of said refractive index of each of said semiconductor nonlinear waveguides, wherein each of said semiconductor nonlinear waveguides comprises:

a nondoped core layer formed of a medium showing a nonlinear refractive index, an under clad layer of a first conductivity type formed under said nondoped core layer, an upper clad layer of a second conductivity type formed on said nondoped core layer, and means for electrically shortcircuiting said under and upper clad layers.

4. An optical switch comprising:

a Mach-Zehnder interferometer provided with a pair of semiconductor nonlinear waveguides on both arms thereof, wherein a refractive index of each of said semiconductor nonlinear waveguides changes by absorption of a control light, and means for supplying said semiconductor nonlinear waveguides with said control light pulses in turn at a predetermined difference in time, which is shorter than a relaxation time of said change of said refractive index of each of said semiconductor nonlinear waveguides, wherein each of said semiconductor nonlinear waveguides comprises:

a n-type InP substrate, a nondoped InGaAsP optical waveguide of a strip structure formed on said n-type InP substrate, nondoped InP layers formed on both sides of said nondoped InGaAsP optical waveguide, a p-type InP layer formed on said nondoped InGaAsP optical waveguide and said nondoped InP layers, a p-type InGaAs cap layer formed on said p-type InP layer, electrodes respectively formed on an obverse surface of said InGaAs cap layer and a reverse surface of said n-type InP substrate, and means for electrically shortcircuiting said electrodes formed on said obverse and reverse surfaces.

5. An optical switch, comprising:

a semiconductor nonlinear waveguide, which shows a change in a refractive index by absorption of a control light, means for separating a signal light into two linearly polarized signal lights perpendicular to each other, means for generating a difference in a propagation time between said two linearly polarized signal lights perpendicular to each other, means for propagating said two linearly polarized signal lights perpendicular to each other through said semiconductor nonlinear waveguide, means for supplying a control light to said semiconductor nonlinear waveguide at a predetermined time, and means for canceling said difference in said propagation time between said two linearly polarized signal lights perpendicular to each other, wherein said nonlinear waveguide comprises:

a nondoped core layer formed of a medium showing a nonlinear refractive index, an under clad layer of a first conductivity type formed under said nondoped core layer, an upper clad layer of a second conductivity type formed on said nondoped core layer, and means for electrically short circuiting said under and upper clad layers.

6. An optical switch, comprising:

a semiconductor nonlinear waveguide, which shows a change in a refractive index by absorption of a control light, means for separating a signal light into two linearly polarized signal lights perpendicular to each other, means for generating a difference in a propagation time between said two linearly polarized signal lights perpendicular to each other, means for propagating said two linearly polarized signal lights perpendicular to each other through said semiconductor nonlinear waveguide, means for supplying a control light to said semiconductor nonlinear waveguide at a predetermined time, and means for canceling said difference in said propagation time between said two linearly polarized signal lights perpendicular to each other, wherein said nonlinear waveguide comprises:

a n-type InP substrate, a nondoped InGaAsP optical waveguide of a strip structure formed on said n-type InP substrate, nondoped InP layers formed on both sides of said nondoped InGaAsP optical waveguide, a p-type InP layer formed on said nondoped InGaAsP optical waveguide and said nondoped InP layers, a p-type InGaAs cap layer formed on said p-type InP layer, electrodes respectively formed on an obverse surface of said InGaAs cap layer and a reverse surface of said n-type InP substrate, and means for electrically shortcircuiting said electrodes formed on said obverse and reverse surfaces.

* * * * *